US010999477B2

(12) United States Patent
Ito et al.

(10) Patent No.: US 10,999,477 B2
(45) Date of Patent: May 4, 2021

(54) IMAGE PROCESSING APPARATUS, METHOD AND STORAGE MEDIUM

(71) Applicant: CANON KABUSHIKI KAISHA, Tokyo (JP)

(72) Inventors: Aya Ito, Tokyo (JP); Tomohisa Itagaki, Abiko (JP); Takaaki Yano, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 16/434,673

(22) Filed: Jun. 7, 2019

(65) Prior Publication Data
US 2019/0387133 A1 Dec. 19, 2019

(30) Foreign Application Priority Data

Jun. 15, 2018 (JP) .............................. JP2018-114903

(51) Int. Cl.
*H04N 1/60* (2006.01)
*H04N 1/38* (2006.01)

(52) U.S. Cl.
CPC ............. *H04N 1/6097* (2013.01); *H04N 1/38* (2013.01); *H04N 1/6005* (2013.01); *H04N 1/6086* (2013.01)

(58) Field of Classification Search
CPC .................................................. H04N 1/6041
See application file for complete search history.

(56) References Cited

U.S. PATENT DOCUMENTS

| | | | | |
|---|---|---|---|---|
| 5,926,202 A | * | 7/1999 | Hattori | ..................... B41J 2/473 347/237 |
| 6,061,153 A | | 5/2000 | Sugita | |
| 6,466,334 B1 | | 10/2002 | Komiya et al. | |
| 6,567,543 B1 | | 5/2003 | Shiraiwa et al. | |
| 7,324,243 B2 | * | 1/2008 | Cheng | ...................... H04N 1/56 358/461 |
| 7,857,114 B2 | * | 12/2010 | Hamasaki | ................ G07D 7/00 194/207 |
| 8,280,155 B2 | | 10/2012 | Ten | |
| 2005/0012948 A1 | | 1/2005 | Gotoh et al. | |
| 2005/0068330 A1 | | 3/2005 | Speigle et al. | |
| 2005/0111693 A1 | | 5/2005 | Loce et al. | |
| 2005/0206928 A1 | | 9/2005 | Itagaki | |

(Continued)

FOREIGN PATENT DOCUMENTS

JP 2002-292909 A 10/2002

*Primary Examiner* — King Y Poon
*Assistant Examiner* — Michael Burleson
(74) *Attorney, Agent, or Firm* — Canon U.S.A., Inc. IP Division

(57) ABSTRACT

An image processing apparatus includes an acquisition unit configured to acquire a chromaticity value, which is a measurement result for a sheet to be measured, by using a sensor in which a light source has fixed characteristics; a designation unit configured to designate a condition under which the measurement result is acquired by the sensor; a determination unit configured to determine an optical brightening agent amount contained in the sheet; and a chromaticity value conversion unit configured to convert the chromaticity value, which is acquired by the acquisition unit, by using the condition designated by the designation unit and information about the optical brightening agent amount determined by the determination unit.

13 Claims, 10 Drawing Sheets

(56) References Cited

U.S. PATENT DOCUMENTS

| | | |
|---|---|---|
| 2006/0098219 A1 | 5/2006 | Kajihara |
| 2009/0010537 A1 | 1/2009 | Horie et al. |
| 2009/0190193 A1 | 7/2009 | Sato |
| 2010/0103455 A1 | 4/2010 | Morikawa |
| 2011/0052057 A1* | 3/2011 | Aihara .................. H04N 1/465 382/167 |
| 2012/0008858 A1 | 1/2012 | Sedky et al. |
| 2012/0183213 A1 | 7/2012 | Robles-Kelly et al. |
| 2013/0093916 A1 | 4/2013 | Bai et al. |
| 2014/0132827 A1 | 5/2014 | Imai et al. |
| 2014/0272339 A1* | 9/2014 | Tyagi ..................... G03G 15/16 428/207 |
| 2017/0048423 A1* | 2/2017 | Itagaki ............... H04N 1/00058 |
| 2018/0234593 A1 | 8/2018 | Itagaki |
| 2019/0387133 A1 | 12/2019 | Ito et al. |

* cited by examiner

FIG. 8

| PRINTING AND MEASUREMENT OF PATCH CHART | | |
|---|---|---|
| CONDITIONS OF PRINTING AND MEASUREMENT OF PATCH CHART | | |
| PATCH SET | 1617 | ~UI802 |
| PATCH SIZE | A3 | ~UI803 |
| MEASUREMENT CONDITION | M1 | ~UI804 |

UI805 — CANCEL  
UI806 — PRINT MEASUREMENT

| REGISTRATION OF SHEET INFORMATION | | | |
|---|---|---|---|
| SHEET INFORMATION | | | |
| NAME | USER SHEET A | CHANGE ▷ | ~UI902 |
| GRAMMAGE | 120 gsm | CHANGE ▷ | ~UI903 |
| SIZE | A3 | CHANGE ▷ | ~UI904 |
| SURFACE PROPERTY | FINE QUALITY PAPER | CHANGE ▷ | ~UI905 |
| OPTICAL BRIGHTENING AGENT AMOUNT | SMALL | CHANGE ▷ | ~UI906 |

UI907 — CANCEL  
UI908 — REGISTER

UI901

IMAGE PROCESSING APPARATUS, METHOD AND STORAGE MEDIUM

BACKGROUND

Field of the Disclosure

The present disclosure generally relates to image processing and, more particularly, to an image processing apparatus, an image processing method, and a storage medium capable of acquiring a chromaticity value according to a desired measurement condition even when a color measurement device in which a light source has fixed characteristics is used.

Description of the Related Art

A printing apparatus of the related art is equipped with various color management functions. Examples thereof include calibration for correcting a color tone of an image output by the printing apparatus, a function of creating a profile so that a desired color is output in an output image, and a function (verification) of determining whether a color of an image output by the printing apparatus meets a criterion.

In recent years, many types of paper have used an optical brightening agent (OBA). The OBA is used to enhance luminance of a sheet and improve visual quality of a printed material. The OBA acts in accordance with a principle of fluorescence and thus absorbs ultraviolet (UV) radiation whose wavelength is 400 nanometers (nm) or less and emits light in a region mainly of the blue visible spectrum of 400 to 450 nm. Accordingly, when a sheet that contains the OBA is irradiated with light that includes UV, not only reflected light, but also fluorescent radiation light is added, and the sheet appears pale. As a result, the colorimetric value differs from actual appearance.

To solve such a difference between a colorimetric value and actual appearance of a sheet that contains the OBA, Japanese Patent Laid-Open No. 2002-292909 discloses a technique of faithfully outputting the color of original image data without being affected by light emitted by the OBA.

SUMMARY

According to one or more aspects of the present disclosure, an image processing apparatus includes: an acquisition unit configured to acquire a chromaticity value, which is a measurement result for a sheet to be measured, by using a sensor in which a light source has fixed characteristics; a designation unit configured to designate a condition under which the measurement result is acquired by the sensor; a determination unit configured to determine an optical brightening agent amount contained in the sheet; and a chromaticity value conversion unit configured to convert the chromaticity value, which is acquired by the acquisition unit, by using the condition designated by the designation unit and information about the optical brightening agent amount determined by the determination unit.

Further features of the present disclosure will become apparent from the following description of exemplary embodiments with reference to the attached drawings.

BRIEF DESCRIPTION OF THE DRAWINGS

FIG. 8 illustrates an example of a UI screen for performing input of a measurement condition.

FIG. 9 illustrates an example of a UI screen for registering sheet information.

DESCRIPTION OF THE EMBODIMENTS

Various exemplary embodiments, features, and aspects of the disclosure will be described in detail below with reference to the drawings, but the present disclosure is not limited to the following exemplary embodiments.

As new standard illuminant conditions (measurement illuminant conditions) of a colorimeter in consideration of ultraviolet light, "M" of ISO 12655-2009 is defined by the ISO.

ISO 12655-2009 defines measurement illuminant conditions of "M0", in which ultraviolet light is not considered, and "M1", in which ultraviolet light is considered.

When the measurement illuminant condition is M0, a colorimetric value obtained by performing, under the condition, color measurement of an image that is formed by using a sheet which does not contain an OBA and a coloring material such as toner correlates with visual perception of human eyes. However, a colorimetric value obtained by performing, under the condition, color measurement of an image that is formed on a sheet which uses the OBA and contains a fluorescent component which may be affected by ultraviolet light does not correlate appropriately with visual perception of human eyes.

Meanwhile, when the measurement illuminant condition is M1, an element of ultraviolet light is also considered in a result of color measurement. Thus, both a colorimetric value of an image that is formed by using a sheet which does not use the OBA and a coloring material such as toner and a colorimetric value of an image that is formed by using a sheet which uses the OBA and a coloring material such as toner, which are obtained by performing color measurement under the condition, correlate appropriately with visual perception of human eyes.

Therefore, in recent years, the measurement illuminant condition M1 has been increasingly used.

Figure 10:
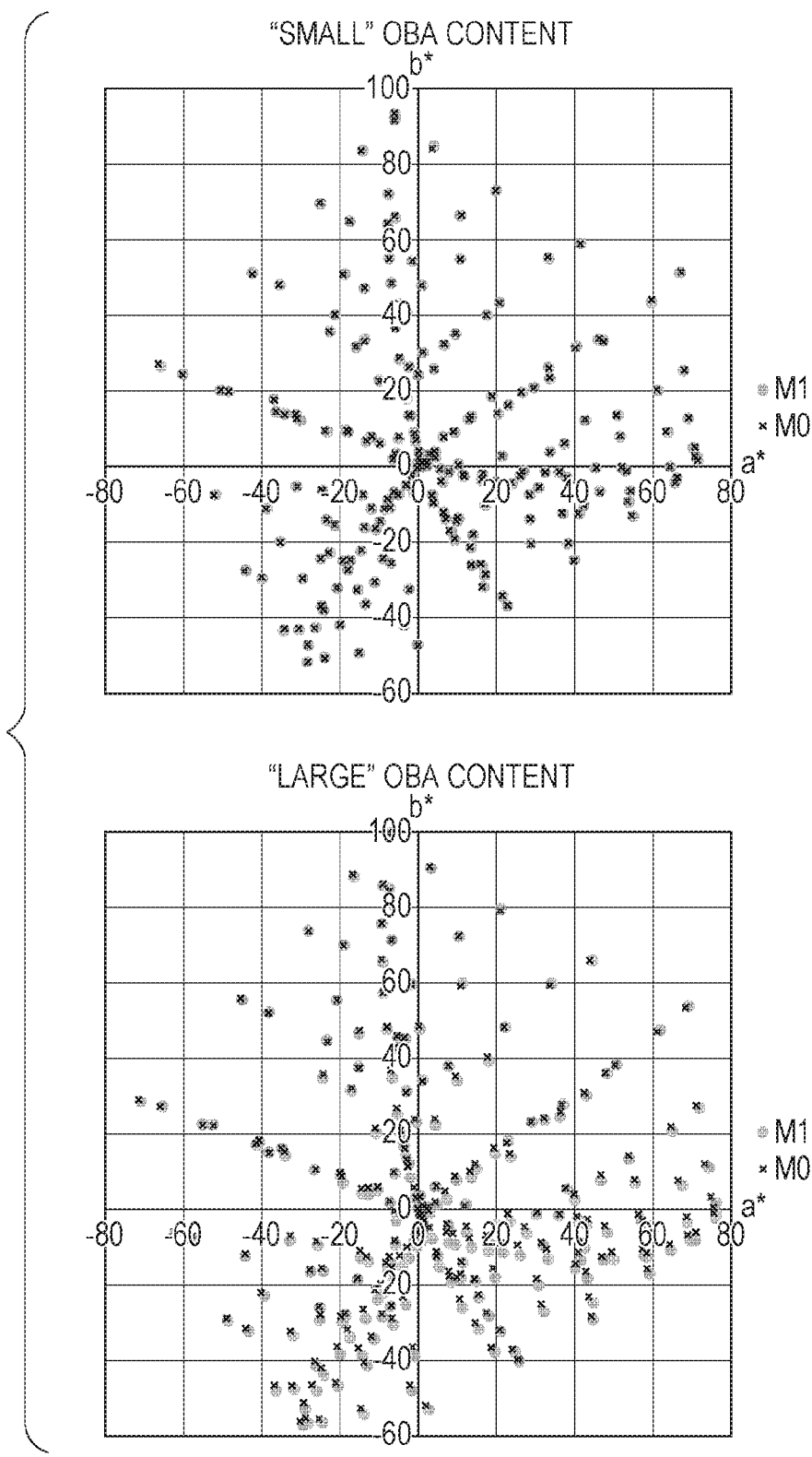
FIG. 10 is a chromaticity distribution view for explaining a relationship between an OBA content and a measurement condition.

FIG. 10 is a view for explaining that a measurement value varies due to a variation in OBA content when a measurement illuminant condition is changed.

By using a spectral color measurement device i1Pro2, in which a light source is able to be changed and which is manufactured by X-Rite Inc., L*a*b* chromaticity values of color patches printed on a sheet with a small OBA content and a sheet with a large OBA content are obtained by performing color measurement under the measurement illuminant conditions M0 and M1.

FIG. 10 illustrates chromaticity distribution in which results of the color measurement are plotted in an a*b* plane.

The result of the color measurement under the measurement illuminant condition M0 and the result of the color measurement under the measurement illuminant condition M1 differ greatly between the sheet with the small OBA content and the sheet with the large OBA content.

As a result of measuring, for example, a blank part in the sheet with the large OBA content, an approximate measurement error of a color difference ΔE=2.5 is caused in some cases.

As the color difference in colorimetric values, ΔE=2.5 is a very large numeric value, and there is a problem in color management, such as a color change in an output material due to lowering of accuracy of profile creation or incompatibility with accuracy of color verification.

In recent years, there has been an image forming apparatus with a configuration in which a spectral color measurement device (hereinafter, inline sensor) is incorporated in the apparatus to perform printing of a color patch and color measurement at the same time.

The inline sensor has strict limitations on unit size and price. Thus, the inline sensor often has a simple configuration, for example, in which only one kind of light source is provided and the measurement illuminant condition under which measurement is allowed is fixed (characteristics of the light source are fixed).

In a case where a color measurement device in which the measurement illuminant condition is fixed to M0 is used, however, when the measurement illuminant condition is designated as M1 and a sheet containing the OBA is subjected to color measurement, there is no correlation between a colorimetric value and appearance as described above, and as a result, appropriate color management may not be performed.

Moreover, in a case where an OBA amount contained in a sheet to be used is not known, an appropriate colorimetric value is not able to be obtained. However, in contrast to grammage and surface property (fine quality paper, coated paper, or the like), the OBA amount is generally, or in many cases, not described in a printing sheet package when the printing sheet is purchased. Thus, it is difficult for a general user to know the OBA amount. Further, in a case where the OBA amount is not published by a supplier or a case where a sheet whose OBA content is not able to be determined by appearance is used, the OBA amount is not able to be known.

The present embodiment is made in view of the aforementioned problems, and the OBA content of a sheet is automatically determined even when the content is not known.

According to the embodiment, even when a sheet to be used is a sheet containing the OBA, an appropriate colorimetric value is able to be acquired.

Hereinafter, various exemplary embodiments, features, and aspects of the disclosure will be described with reference to the drawings.

Exemplary Embodiment 1

[Hardware Configuration of Image Processing Apparatus]

Figure 1:
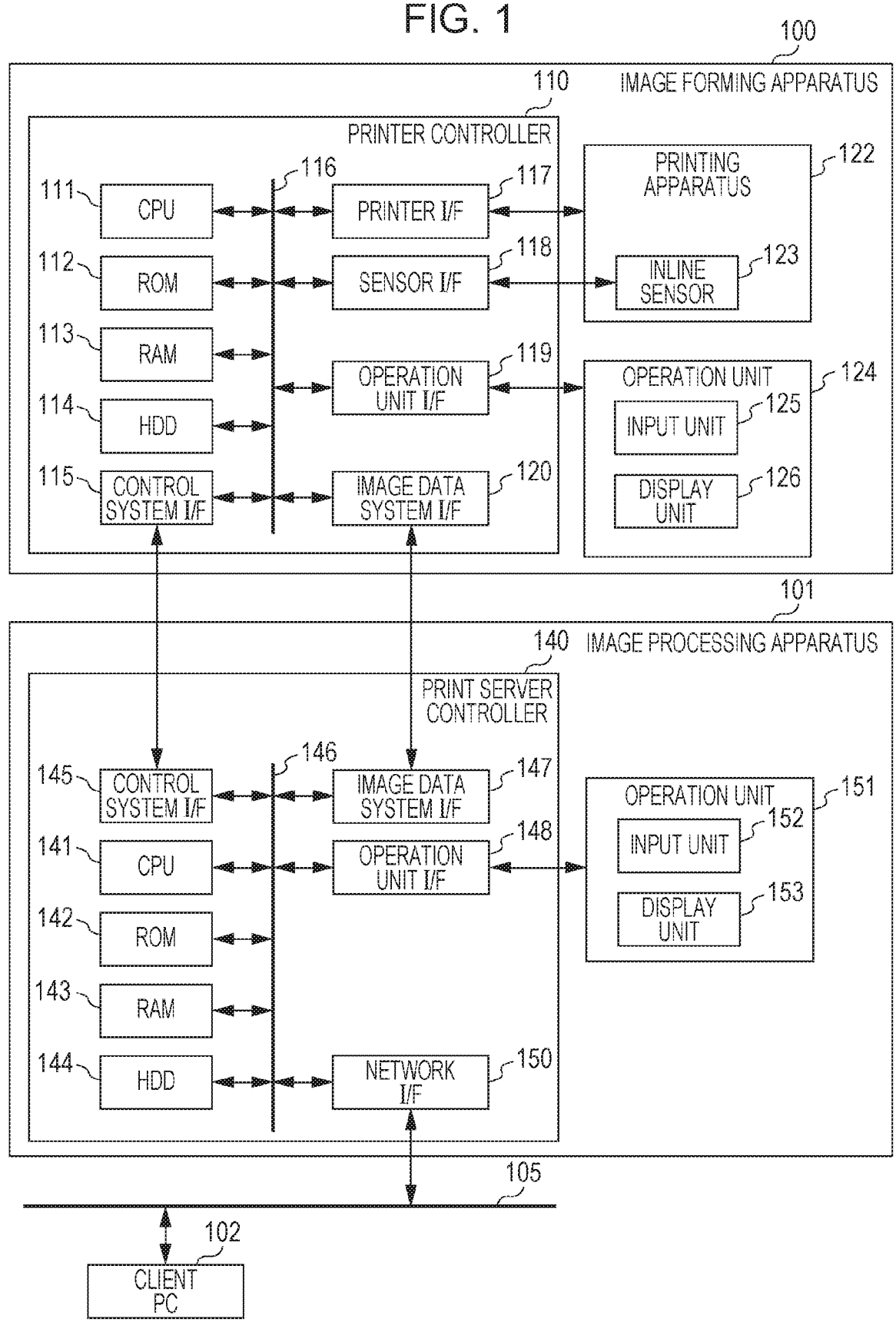
FIG. 1 illustrates a hardware configuration of an image processing apparatus.

FIG. 1 is a block diagram illustrating a hardware configuration of an image processing apparatus according to the present exemplary embodiment.

In an image forming apparatus 100, a printer controller 110 is a printer controller of the image forming apparatus 100. A central processing unit (CPU) 111, which may include one or more processors, one or more memories, circuitry, or a combination thereof, may comprehensively control access to various kinds of devices, which are connected through a system bus 116, in accordance with a control program stored in a read-only memory (ROM) 112 or on a hard disk drive (HDD) 114. The ROM 112 stores a control program and the like that are able to be executed by the CPU 111. A random access memory (RAM) 113 functions mainly as a main memory, a work area, and the like of the CPU 111 and is configured to have a memory capacity that is able to be expanded by using an optional RAM connected to an expansion port (not illustrated). The HDD 114 stores a boot program, various kinds of applications, font data, a user file, an edit file, and the like. Note that, though the HDD 114 is used in the present exemplary embodiment, a secure digital (SD) card, a flash memory, or the like may be used as an external storage device, in addition to the HDD 114. A control system interface (I/F) 115 receives information needed for print control from an image processing apparatus 101. A printer I/F 117 controls image output to a printing apparatus 122. An operation unit I/F 119 performs display control of a display unit 126 provided in an operation unit 124 and control of input of various kinds of setting information set by an input unit 125. An image data system I/F 120 receives, from the image processing apparatus 101, image data to be transmitted to the printing apparatus 122.

A sensor I/F 118 transmits an operation instruction of an inline sensor (hereinafter, may be referred to as ILS) 123 provided in the printing apparatus 122 and receives a measurement result of the inline sensor 123. The inline sensor 123 will be described below.

In the image processing apparatus 101, a print server controller 140 performs processing, such as analysis of a print job that is input or development processing into image data, to perform print processing in the image processing apparatus 101. A CPU 141 comprehensively controls access to various kinds of devices, which are connected through a system bus 146, in accordance with a control program stored in a ROM 142 or on an HDD 144. The ROM 142 stores a control program and the like that are able to be executed by the CPU 141. A RAM 143 functions mainly as a main memory, a work area, and the like of the CPU 141 and is configured to have a memory capacity that is able to be expanded by using an optional RAM connected to an expansion port (not illustrated). The HDD 144 stores a boot program, various kinds of applications, font data, a user file, an edit file, and the like. Note that, though the HDD 144 is used in the present exemplary embodiment, an SD card, a flash memory, or the like may be used as an external storage device, in addition to the HDD 144.

A control system I/F 145 transmits, to the image forming apparatus 100, information needed for print control.

An image data system I/F 147 transmits, to the image forming apparatus 100, image data to be output by the printing apparatus 122.

An operation unit I/F 148 performs display control of a display unit 153 provided in an operation unit 151 and control of input of various kinds of setting information set by an input unit 152. Here, though the image forming apparatus 100 and the image processing apparatus 101 are respectively configured to have independent operation units 124 and 151, both operation units may be configured to use common hardware.

A network I/F 150 performs data communication with an external network 105 via a network cable.

A client personal computer (PC) 102 is connected to the image processing apparatus 101 through the external network 105. The client PC 102 inputs a print job to the image processing apparatus 101.

[Hardware Configuration of Inline Sensor]

Figure 2:
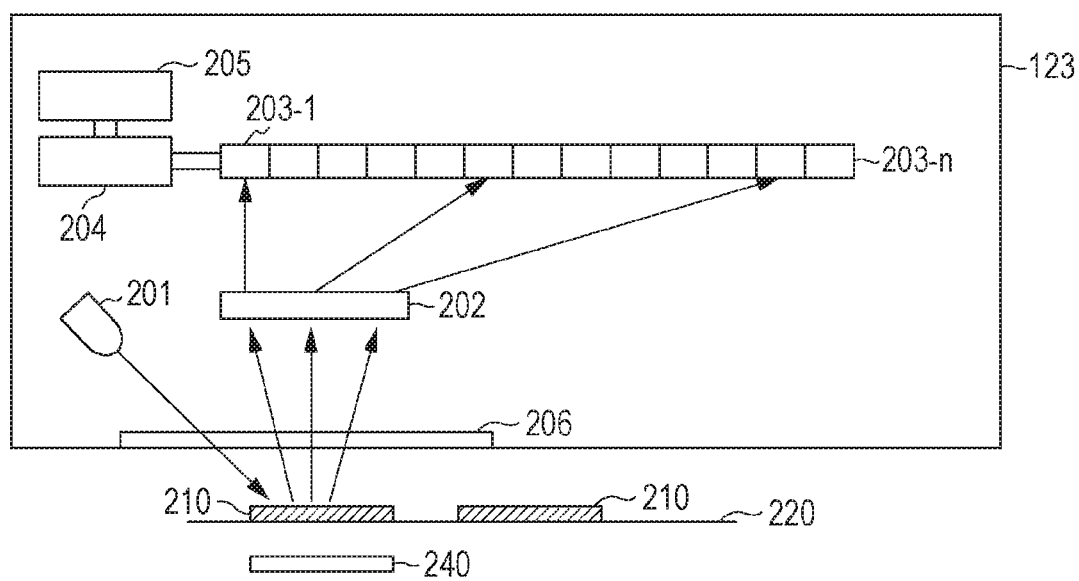
FIG. 2 illustrates a hardware configuration of an inline sensor.

FIG. 2 illustrates a hardware configuration of the inline sensor 123 provided in the printing apparatus 122, and the inline sensor 123 is also commonly called an ILS. The inline sensor 123 is installed in a sheet conveyance path of the printing apparatus 122 in a portion from a fixing unit (not illustrated) to a sheet output port (not illustrated) in the sheet conveyance path.

The inline sensor 123 includes a white light emitting diode (LED) 201, a diffraction grating 202, a line sensor 203 (203-1 to 203-$n$, where n is any integer), a calculation unit 204, and a memory 205. The white LED 201 irradiates a measurement image 210 on a sheet 220 with light.

The diffraction grating 202 spectrally disperses reflected light of each wavelength from the measurement image 210. The line sensor 203 includes n light receiving elements (n pixels). The calculation unit 204 performs various kinds of calculation in accordance with a light intensity value of each of the pixels of the line sensor 203. The memory 205 stores various kinds of data.

The inline sensor 123 detects the light intensity of reflected light of wavelengths ranging from 380 [nm] to 720 [nm] at intervals of 10 [nm]. In this case, n is 34. The calculation unit 204 includes, for example, a spectral calculation unit that calculates a spectral reflectance in accordance with the light intensity value of each of the pixels of the line sensor 203, a L*a*b calculation unit that calculates L*a*b* values, and the like. The inline sensor 123 may include a lens 206 that condenses light, which is emitted from the white LED 201, onto the measurement image 210 on the sheet 220 or condenses reflected light from the measurement image 210 onto the diffraction grating 202.

The inline sensor 123 has a white reference plate 240 made primarily from alumina (aluminum oxide). The inline sensor 123 adjusts the light amount of the white LED 201 by using the white reference plate 240. For example, the inline sensor 123 emits light from the white LED 201 in a state where the sheet 220 has not passed through a measurement position of the inline sensor 123 and receives light reflected from the white reference plate 240 with the line sensor 203. The calculation unit 204 adjusts the light emission intensity of the white LED 201 so that the light intensity value of a predetermined pixel of the line sensor 203 becomes a predetermined value.

Figure 3:
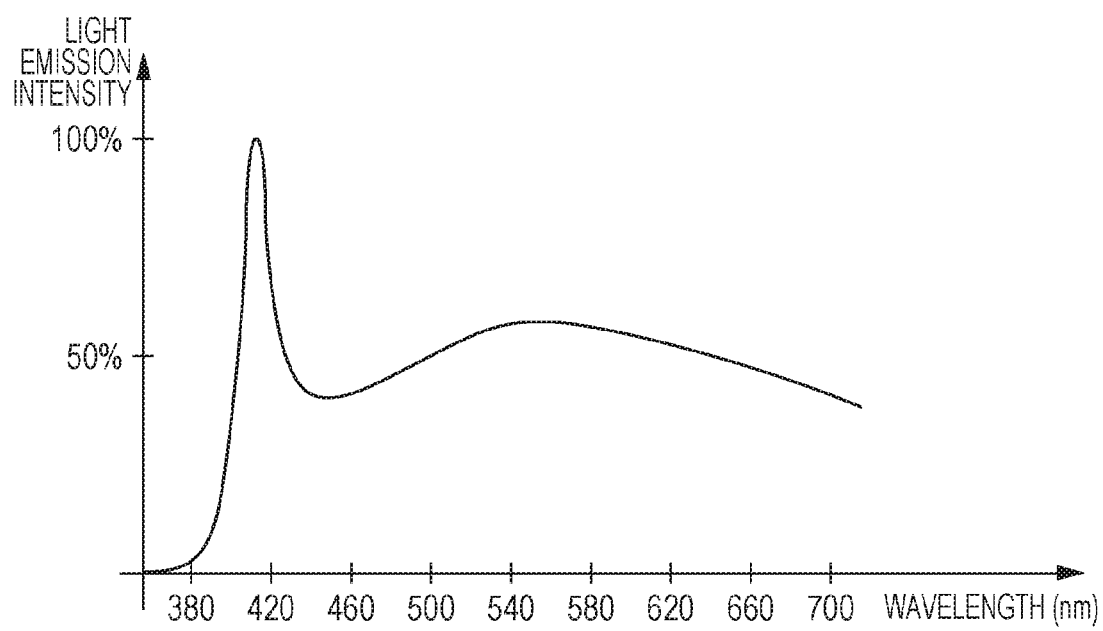
FIG. 3 illustrates distribution of light emission intensity of a white LED.

FIG. 3 illustrates distribution of the light emission intensity of the white LED 201. The horizontal axis denotes the wavelength of light emitted from the white LED 201 and the vertical axis denotes the light emission intensity.

The white LED 201 is characterized as a light source that emits short-wavelength light of 400 nm or less, which is easily affected by an optical brightening agent contained in a sheet.

The inline sensor 123 has a light source that has a fixed characteristic (wavelength), which may be considered equivalent to a case where the measurement illuminant condition is M0.

[Software Configuration of Image Forming Apparatus]

Figure 4:
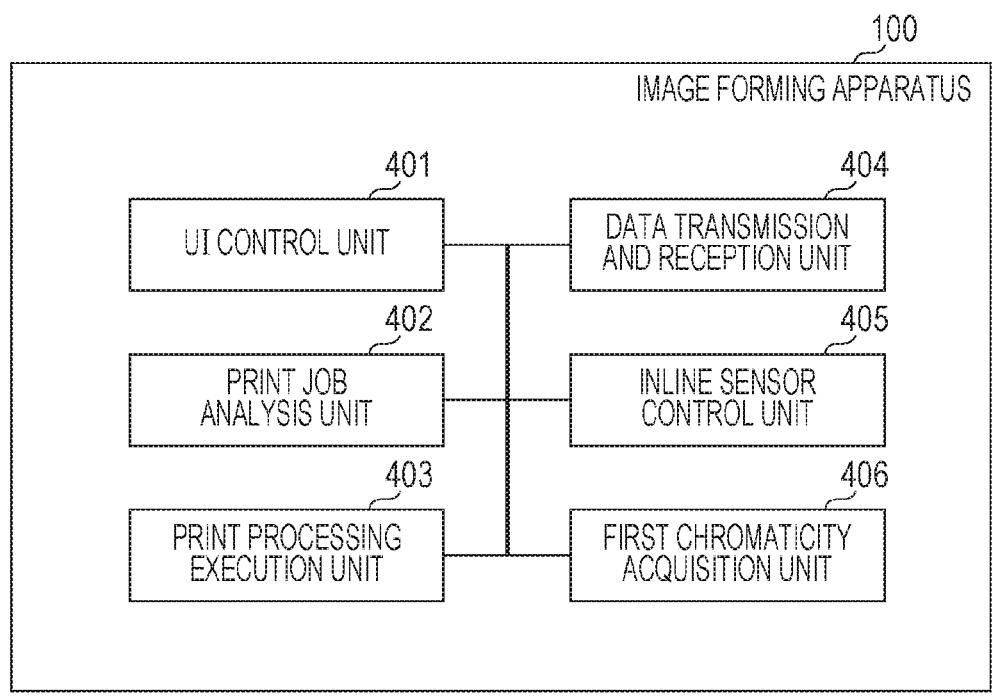
FIG. 4 illustrates a software configuration of an image forming apparatus.

FIG. 4 is a block diagram illustrating a software module configuration of the image forming apparatus 100 according to the present exemplary embodiment.

FIG. 4 is a block diagram related to a software module configuration of the image forming apparatus 100 according to the present exemplary embodiment. Software modules thereof are stored as programs on the HDD 114 and read and loaded into the RAM 113 by the CPU 111 for execution.

A user interface (UI) control unit 401 performs, through the operation unit I/F 119, display control of the display unit 126 in the operation unit 124 and control of input of various kinds of setting information set on the input unit 125.

A print job analysis unit 402 analyzes data of a print job received from the image processing apparatus 101.

A print processing execution unit 403 controls a series of print operations, such as sheet feeding, sheet conveyance, printing, and sheet discharging, which are performed in the printing apparatus 122 for the analyzed print job.

A data transmission and reception unit 404 controls data transmission and reception to and from the image processing apparatus 101. Examples of the data to be transmitted and received include data of a print job, chromaticity data acquired through measurement of the inline sensor 123, and the like.

An inline sensor control unit 405 controls a measurement operation of the inline sensor 123 provided in the image forming apparatus 100. By controlling the inline sensor 123 at a timing programmed in advance, spectral information of a predetermined color patch printed on a sheet is acquired.

A first chromaticity acquisition unit 406 acquires a predetermined chromaticity value from the spectral information acquired by the inline sensor 123 controlled by the inline sensor control unit 405. The chromaticity value denotes, for example, L*a*b*.

As described above, an inline sensor in which characteristics of a light source are fixed is only able to acquire spectral information of one kind of light source. Thus, the chromaticity value acquired from the acquired spectral information of the one kind of light source is also one kind. In the present exemplary embodiment, the inline sensor 123 in which the white LED 201 serves as the light source is used. Thus, a first chromaticity value is treated as a value acquired under a condition corresponding to the measurement illuminant condition M0.

[Software Configuration of Image Processing Apparatus]

Figure 5:
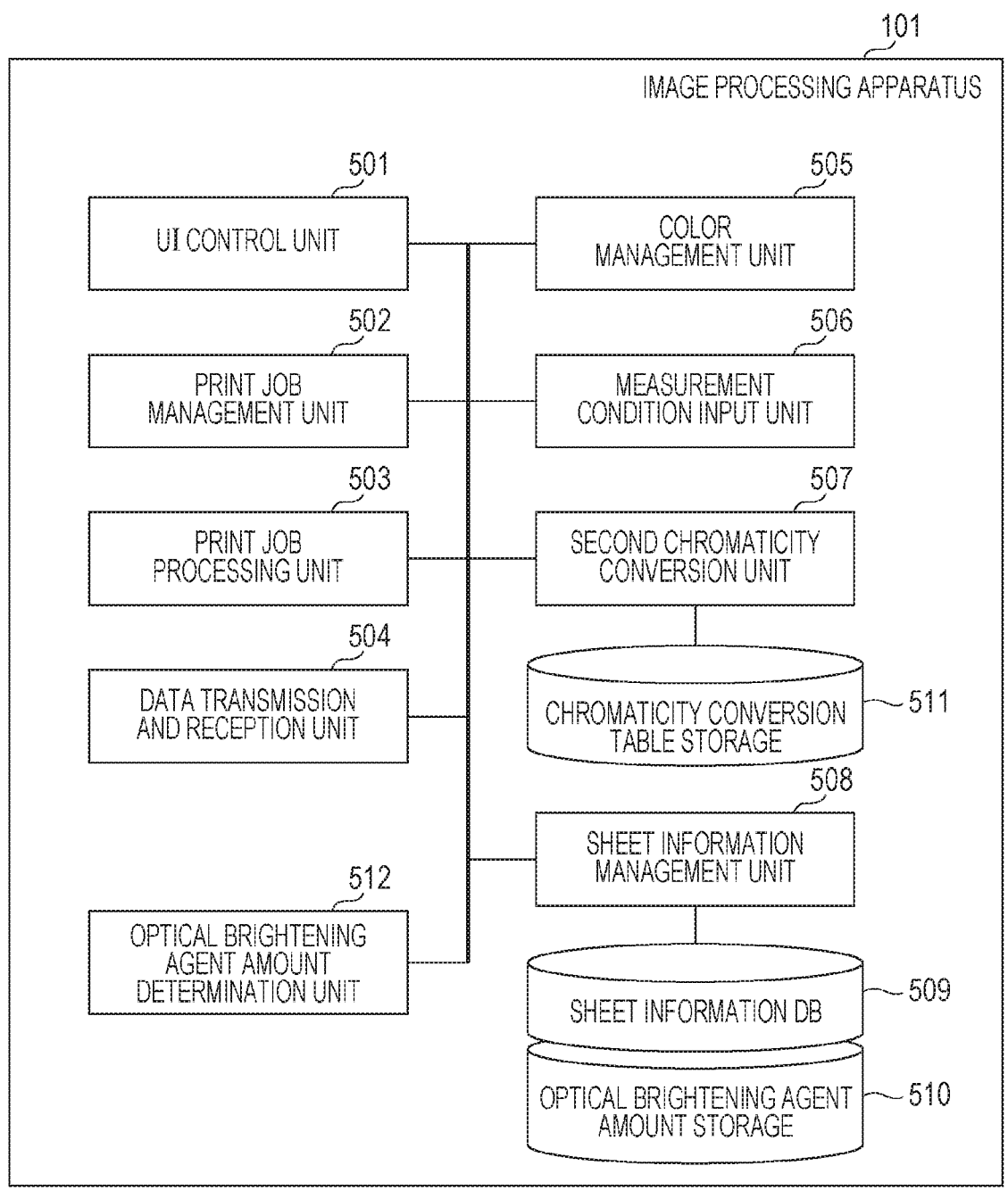
FIG. 5 illustrates a software configuration of the image processing apparatus.

FIG. 5 is a block diagram related to a software module configuration of the image processing apparatus 101 according to the present embodiment. Software modules thereof are stored as programs on the HDD 144 and read and loaded into the RAM 143 by the CPU 141 for execution.

A UI control unit 501 performs, through the operation unit I/F 148, display control of the display unit 153 in the operation unit 151 and control of input of various kinds of setting information set on the input unit 152.

A print job management unit 502 manages print job data received from a user. Specifically, the print job management unit 502 performs processing such as calling a print job stored on the HDD 144, reflecting a change of print job setting, or managing the history of a job already printed.

A print job processing unit 503 performs processing needed to perform print processing, such as analysis of a print job received from the user, development into image data, or image compression and decompression.

A data transmission and reception unit 504 manages transmission and reception of various kinds of data to and from the image forming apparatus 100. The data transmission and reception unit 504 transmits print job data generated by the print job processing unit 503 to the image forming apparatus 100. Further, the data transmission and reception unit 504 manages transmission and reception of data to and from the client PC 102 connected through the network I/F 150 via an external network.

A color management unit 505 controls and performs various kinds of color management processing to keep and manage image quality related to color impression in the image processing apparatus 101. Color management processing refers to, for example, color check processing that determines a state of a color of an image that is currently output from the image forming apparatus 100, calibration processing performed to improve the color to have an appropriate state, color profile creation processing, or the like. All of the processing may use a chromaticity value of a predetermined color patch formed and printed on a sheet to be acquired. A difference between the acquired chromaticity value and a target chromaticity value is acquired, calibration data is updated so that the acquired chromaticity value approaches the target chromaticity value, or a color profile is created.

A measurement condition input unit 506 receives a setting of a measurement illuminant condition for measuring a color of an image, which is requested by the color management unit 505. The measurement illuminant condition mentioned here indicates a setting value of M (hereinafter, an M factor) which is a measurement illuminant condition of a color measurement device defined by ISO 12655-209 described above.

A second chromaticity conversion unit 507 performs processing of converting a chromaticity value, which is a chromaticity value received from the image forming apparatus 100 and obtained through color measurement by the inline sensor 123, into a second chromaticity value so as to satisfy the aforementioned measurement condition. Conversion table information used to convert the chromaticity value is stored in a chromaticity conversion table storage 511. A processing procedure of the conversion unit will be described in detail below.

A sheet information management unit 508 manages sheet information used in the image processing apparatus 101. The sheet information is stored in a sheet information database (DB) 509 as a set of parameters indicating characteristics of a sheet, such as sheet name, size, grammage, and surface property. Here, a certain number of pieces of sheet information are generally stored in advance by a supplier that manufactures and sells an image processing system and the user is able to read and use the information as desired.

Moreover, a parameter that is a feature of the present embodiment and indicates an optical brightening agent amount of a sheet is also stored in an optical brightening agent amount storage 510, which is a part of the sheet information DB 509. In the present embodiment, it is assumed that the parameter denoting the optical brightening agent amount of the sheet is constituted by three values of "no", "small", and "large", and one of these is stored in association with the sheet information. However, the number of types of the parameter of the optical brightening agent amount is not limited to three and may be two of, for example, "with" and "without", or the parameter may be constituted by four or more types of elements that are further classified.

Note that, the parameter indicating the optical brightening agent amount in the present embodiment is stored in advance by the supplier in the optical brightening agent amount storage 510 as one of the parameters of the sheet information in accordance with information about the optical brightening agent amount published by a supplier that manufactures and sells a sheet.

The optical brightening agent amount storage 510 is also able to receive input of the OBA amount by the user through the UI control unit 501.

Further, an optical brightening agent amount determination unit 512 automatically determines the OBA amount by the ILS 123.

[Flowchart of Processing Performed in Image Forming Apparatus]

Figure 6:
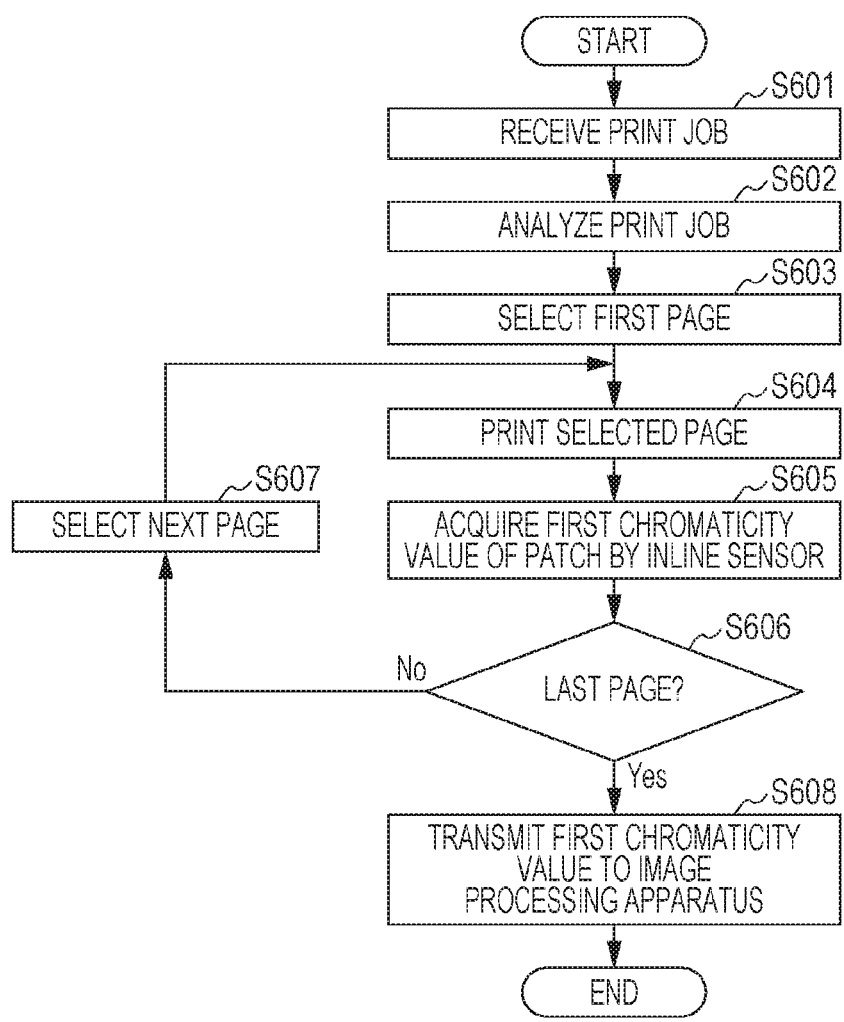
FIG. 6 is a flowchart of processing from chart printing to patch measurement in the image forming apparatus.

FIG. 6 is a flowchart illustrating processing performed by the image forming apparatus 100 from a print instruction of a color patch chart being received to a colorimetric value of the patch being acquired (colorimetric value acquisition) by the inline sensor 123 and transmitted to the image processing apparatus 101, according to the present embodiment. In the present flowchart, a program stored on the HDD 114 is read and loaded into the RAM 113 and executed by the CPU 111 in the image forming apparatus 100. When a print job transmitted in S703 and performed in the image processing apparatus 101 as described below is received by the image forming apparatus 100, the processing described in the present flowchart starts.

In step S (hereinafter, denoted as S) 601, the CPU 111 receives a print job of the color patch chart from the image processing apparatus 101 through the data transmission and reception unit 404.

The CPU 111 causes the print job analysis unit 402 to analyze the received print job in S602 and selects a first page of the print job in subsequent S603.

In S604, the CPU 111 causes the print processing execution unit 403 to perform printing of the selected page. The print processing execution unit 403 creates a color patch on and fixes the color patch onto a printing sheet with toner in accordance with analyzed page information in the printing apparatus 122 and outputs the result to a sheet discharging destination (not illustrated) connected to the printing apparatus 122.

In S605, the CPU 111 performs color measurement of the color patch printed on and fixed onto the sheet. At this time, the inline sensor control unit 405 measures a spectral value by using the inline sensor 123. Then, the first chromaticity acquisition unit 406 acquires a chromaticity value from the spectral value measured by using the inline sensor 123. The chromaticity value acquired here is, for example, an L*a*b* value.

Here, a method of acquiring L*a*b* values performed by the first chromaticity acquisition unit 406 will be described. The calculation unit 204 of the inline sensor 123 acquires absolute spectral reflectance ARP ($\lambda$) by using values described below.

Specifically, a detection result P ($\lambda$) of the line sensor 203 that corresponds to reflected light from a measurement image, a detection result W ($\lambda$) of the line sensor 203 that corresponds to reflected light from the white reference plate 240, and the absolute spectral reflectance ARW ($\lambda$) of the white reference plate 240 itself are used. The absolute spectral reflectance ARW ($\lambda$) indicates reflectance when that of barium sulfate, which is a perfectly diffusing sample, is 100%. By using the values, the absolute spectral reflectance ARP (λ) of the measurement image is acquired by using formula 1.

$$ARP(\lambda)=P(\lambda)/W(\lambda)\times ARW(\lambda) \tag{1}$$

The calculation unit 204 converts the absolute spectral reflectance ARP (λ) into L*a*b* by a calculation method defined in ISO 13655. In the present embodiment, a color matching function is defined in JIS Z8701, and SD 50 (λ) defined in JIS Z8720 is used as the standard light spectral distribution.

XYZ values of the absolute reflectance of each wavelength are acquired by calculation using the color matching function and SD 50 and converted into L*a*b* values.

In subsequent S606, the CPU 111 checks whether or not the page that is currently selected and being processed is the last page of the print job, and if the page is the last page (YES in S606), the procedure proceeds to S608. Otherwise (NO in S606), the CPU 111 selects the next page in S607, and the procedure proceeds to S604.

In S608, the CPU 111 transmits, to the image processing apparatus 101, chromaticity values for all color patches of the print job, which are acquired by the first chromaticity acquisition unit 406, and the present flow ends.

[Flowchart of Processing Performed in Image Processing Apparatus]

Figure 7:
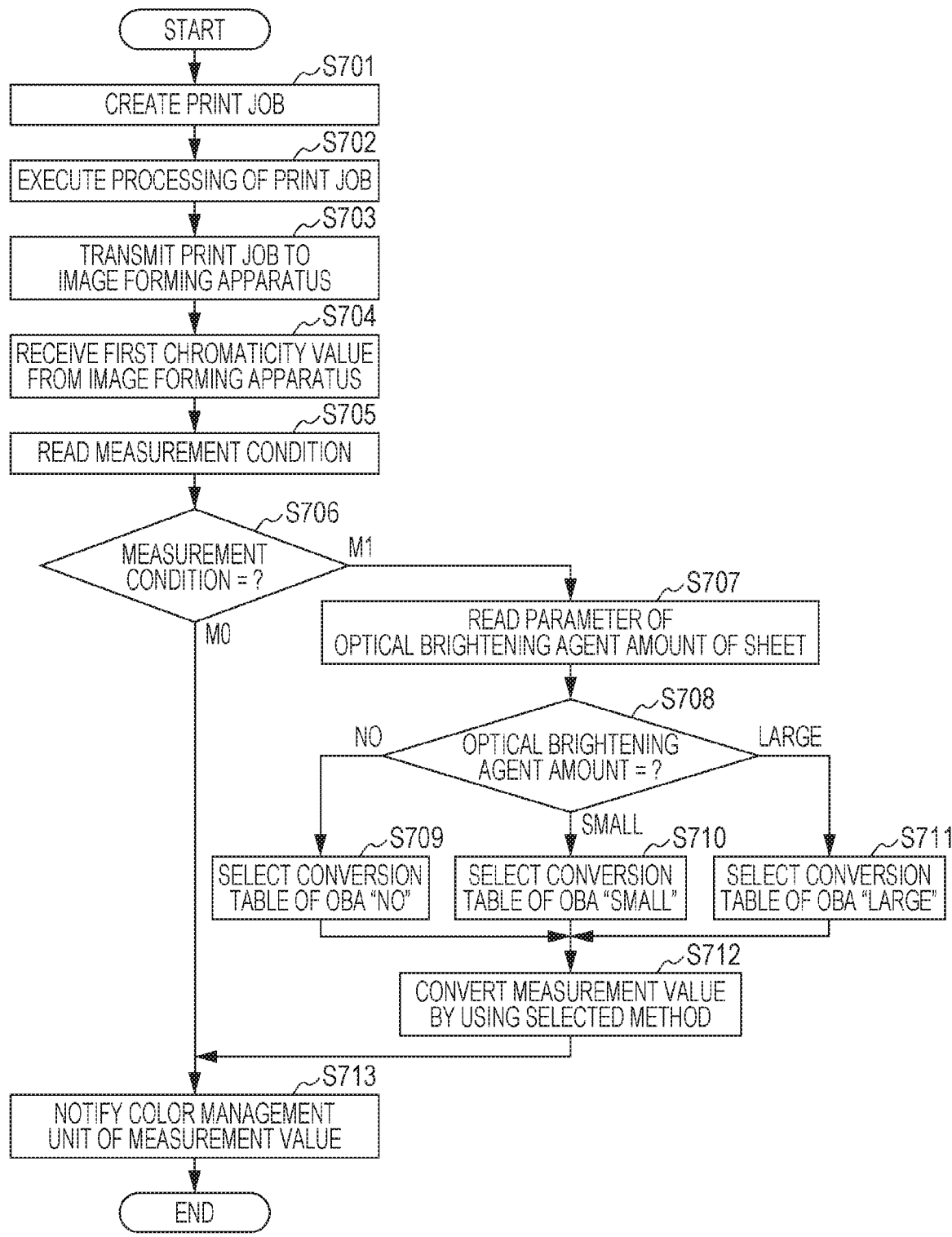
FIG. 7 is a flowchart illustrating an operation of a first exemplary embodiment.

FIG. 7 is a flowchart illustrating processing performed in the image processing apparatus 101 from a print instruction of a color patch chart being given to a measurement value being acquired, according to the present embodiment. The process illustrated in the present flowchart is executed by the CPU 141 when a program stored on the HDD 144 is read and loaded into the RAM 143 in the image processing apparatus 101. The present flowchart starts when the color management unit 505 provides an instruction to perform printing of the color patch chart.

FIG. 8 illustrates an example of a UI for receiving conditions of printing and measurement of the color patch chart used in the present embodiment. The UI is displayed on the display unit 153 through the operation unit 151 under control of the UI control unit 501 in the image processing apparatus 101. When the color management unit 505 receives an instruction for execution of any color management processing, for example, through a UI (not illustrated) from a user, the UI as illustrated in FIG. 8 is displayed for the color management unit 505 to receive settings related to the color patch chart. Here, a patch set UI802 for designating the number of patches to be printed, a patch size UI803 for designating a size of a sheet used for printing a chart in which a patch is formed, and a measurement condition UI804 for designating an output condition of a measurement value of the printed chart are designated. A parameter to be designated is not limited thereto and may be designated from a UI screen UI801 as long as the parameter is needed for printing the color patch chart, for example, such as sheet type. When a cancel button UI805 is pressed, the color management unit 505 ends display in the UI. When a print measurement button UI806 is pressed, the color management unit 505 creates a print job for printing the color patch chart and printing and measurement processing of the color patch chart is started in accordance with a flowchart described below.

In S701, the CPU 141 creates the print job of the color patch chart in accordance with the designated setting. A configuration of the print job created here is determined in accordance with information that includes the patch set, the patch size, or the like which is input in the UI screen UI801.

In S702, the CPU 141 causes the print job processing unit 503 to perform print processing such as rasterizing processing for the print job that is created.

In S703, the CPU 141 transmits print job data, which has been subjected to the print processing, to the image forming apparatus 100 through the data transmission and reception unit 504. The CPU 141 may, as desired, transmit patch configuration information (information about the number of patches or the arrangement) of the color patch chart, which is to be transmitted as the print job, to the image forming apparatus 100 to be used in the inline sensor control unit 405 of the image forming apparatus 100.

In S704, the CPU 141 receives first chromaticity values for all printed color patches through the data transmission and reception unit 504 from the image forming apparatus 100.

In S705, the CPU 141 reads a measurement condition input to the measurement condition input unit 506. The measurement condition that is read here is a value set in the measurement condition UI804 of FIG. 8 and a value of the M factor described above. In the present embodiment, M0 or M1 is selected. M0 indicates the measurement condition in which ultraviolet light is not considered. M1 indicates the measurement condition in which ultraviolet light is considered.

In subsequent S706, the CPU 141 determines the read measurement condition. When the measurement condition is "M0", the procedure proceeds to S713. Alternatively, when the measurement condition is "M1" in S706, the procedure proceeds to S707.

When the measurement condition is "M1" in S706, the CPU 141 reads, by using the second chromaticity conversion unit 507, a parameter of the optical brightening agent amount of a sheet used for printing the color patch chart from the optical brightening agent amount storage 510 in subsequent S707. In S708, the CPU 141 determines the optical brightening agent amount of the sheet. In accordance with the read parameter of the optical brightening agent amount, the procedure proceeds to any of S709 to S711 and the CPU 141 selects a conversion method. When the parameter of the optical brightening agent amount corresponds to "no", the procedure proceeds to S709 and the CPU 141 selects a conversion table which is suitable for the parameter and used to convert the first chromaticity value into the second chromaticity value. When the parameter of the optical brightening agent amount corresponds to "small", the procedure proceeds to S710 and the CPU 141 selects a conversion table which is suitable for the parameter and used to convert the first chromaticity value into the second chromaticity value. When the parameter of the optical brightening agent amount corresponds to "large", the procedure proceeds to S711 and the CPU 141 selects a conversion table which is suitable for the parameter and used to convert the first chromaticity value into the second chromaticity value.

In subsequent S712, the CPU 141 uses the conversion table selected at any of S709 to S711 and converts the chromaticity value received in S704 from the first chromaticity value into the second chromaticity value by the second chromaticity conversion unit 507.

Here, the method of converting the first chromaticity value into the second chromaticity value will be described.

The first chromaticity value and the second chromaticity value according to L*a*b* are assumed to be (L1*, a1*, b1*) and (L2*, a2*, b2*), respectively. The conversion from the first chromaticity value into the second chromaticity value in the present embodiment is performed by direct mapping using a look-up table. A relation when the first chromaticity value (L1*, a1*, b1*) is converted into the second chromaticity value (L2*, a2*, b2*) is stored as a table in the chromaticity conversion table storage 511. Further, by using a conversion relation at the closest position as a distance in the L*a*b space in the chromaticity conversion table, chromaticity value conversion of the first chromaticity value obtained by color measurement is performed. Alternatively, the second chromaticity value after the conversion may be calculated as a weighted average by using conversion relations at multiple positions near that position. Here, the look-up table in which the conversion relations are described exists as different tables for each of the conversion methods of S709, S710, and S711.

As indicated in the example of comparing measurement values described above, a relationship of a chromaticity value varies in accordance with the content of the optical brightening agent and the measurement condition. Thus, when the conversion is performed by using one (common) conversion table not depending on the optical brightening agent amount and without considering the optical brightening agent amount, a variation is caused in the accuracy of the chromaticity value after the conversion. Therefore, the conversion method is changed by using a plurality of conversion tables in consideration of the relationship of the chromaticity value according to the optical brightening agent amount. The conversion table information is determined in advance by the supplier and stored in the chromaticity conversion table storage 511.

Though a description has been given with the method of direct mapping using the look-up table in the present embodiment, the method for performing the chromaticity value conversion is not limited thereto and another method may be used. As another conversion method, for example, a matrix operation is performed as described below. Here, p1 to p3 are matrix operation coefficients, and coefficients of the conversion methods of S709, S710, and S711 are values in consideration of the influence of the optical brightening agent. Thus, some or all of the coefficients are different depending on the optical brightening agent amount.

$$(L2* \ a2* \ b2*) = \begin{pmatrix} p1 \\ p2 \\ p3 \end{pmatrix} (L1* \ a1* \ b1*)$$

In a case of such a method, by storing the respective matrix operation coefficients, instead of the look-up table described above, in a storage corresponding to the chromaticity conversion table storage 511, chromaticity conversion processing is able to be implemented.

After the conversion into the second chromaticity value in S712 or when the measurement condition is "M0" in S706, the CPU 141 notifies the color management unit 505 of the decided chromaticity value in S713 and the present flow ends.

The color management unit 505 is able to perform desired color management processing by using the second chromaticity value according to the measurement condition acquired through the flow.

Next, processing of detecting, by using the ILS 123, the optical brightening agent amount contained in a sheet to be measured and storing a result of the detection in the optical brightening agent amount storage 510 described in FIG. 5 will be described with reference to FIGS. 11 and 12.

Figure 11:
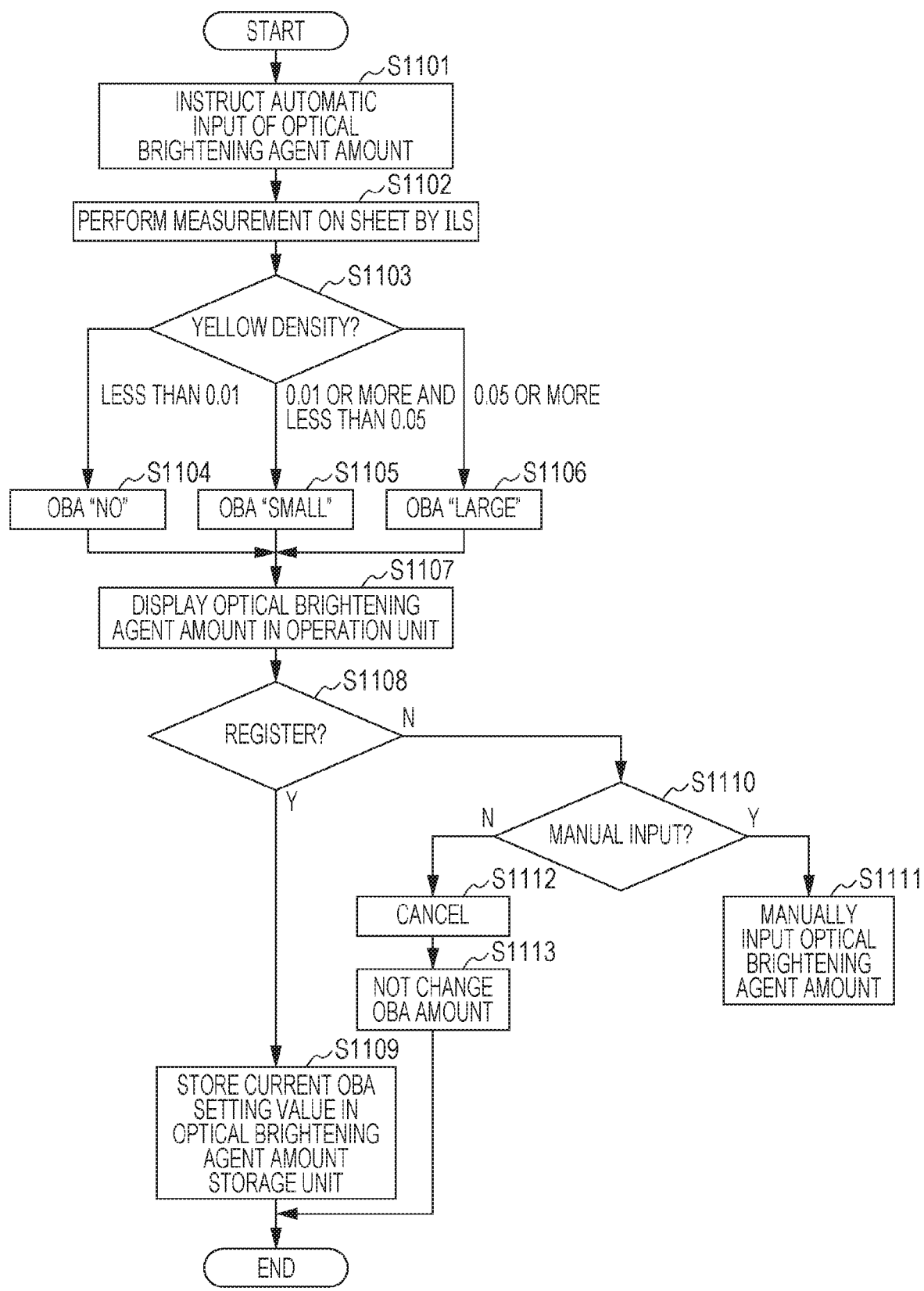
FIG. 11 is a flowchart illustrating an operation of the first exemplary embodiment.

A program of the image processing apparatus 101, which is denoted by the flowchart of FIG. 11, is executed by the CPU 141 when the program stored on the HDD 144 is read and loaded into the RAM 143. A flow thereof is more specifically such that the color management unit 505 instructs the sheet information management unit 508 to change the optical brightening agent amount, and, in accordance with an instruction from the operation unit 151, the optical brightening agent amount determination unit 512 detects a blank part of the sheet for measurement by using the ILS 123, and then, the optical brightening agent amount is determined from a feature amount acquired by using a result of the measurement.

In the present exemplary embodiment, the image processing apparatus 101 is provided with a sheet information input unit (not illustrated). The sheet information input unit receives sheet information from outside and stores the sheet information in the sheet information DB 509 and in the optical brightening agent amount storage 510.

FIG. 9 illustrates an example of a UI screen in which sheet information is input, according to the present exemplary embodiment. The UI screen is displayed on the display unit 153 through the operation unit 151 under control of the UI control unit 501 in the image processing apparatus 101.

Figure 12:
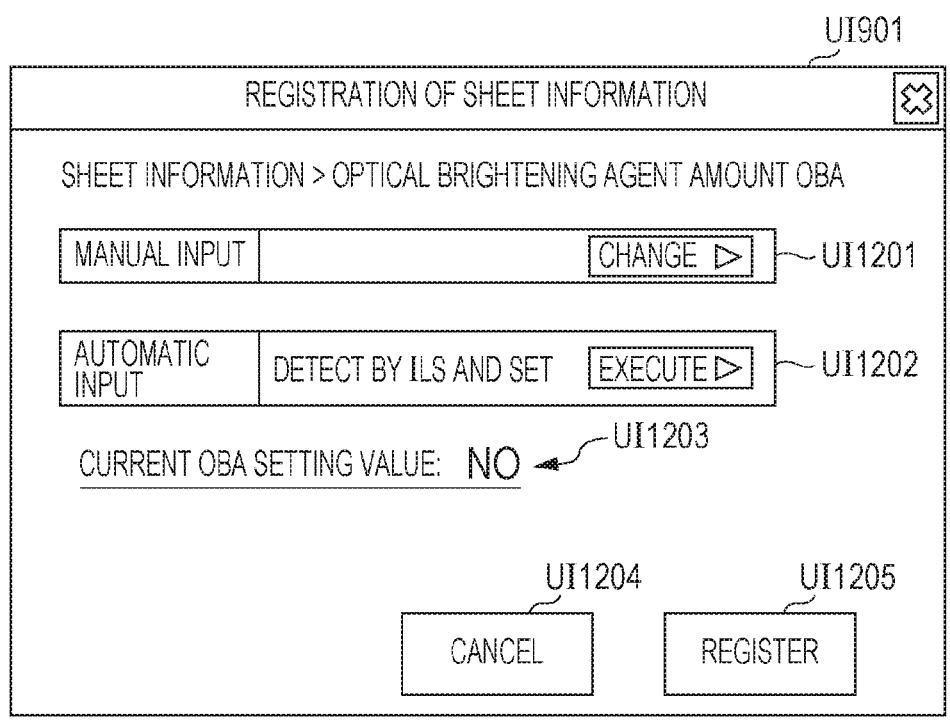
FIG. 12 illustrates a UI screen for registering sheet information.

Upon pressing of a change button UI 906 of the "optical brightening agent amount" in the screen of "registration of sheet information" illustrated in FIG. 9, the CPU 141 shifts the screen displayed in the display unit 153 to a UI screen illustrated in FIG. 12. The screen of FIG. 12 has a configuration in which the optical brightening agent amount in the sheet information is manually input or automatically input to be set and registered.

When an execute button of automatic input is pressed in a UI 1202 (S1101 of FIG. 11), the CPU 141 instructs the inline sensor control unit 405 in the image forming apparatus 100 to measure, with use of the ILS 123, a density of a blank part in a sheet whose OBA content is to be determined.

The blank part is a part not subjected to image formation with toner. In accordance with the instruction, the measured density is input to the optical brightening agent amount determination unit 512 (S1102).

The CPU 141 causes the optical brightening agent amount determination unit 512 to determine the optical brightening agent amount from a feature amount obtained from a density measurement result for the blank part acquired by using the ILS 123 (S1103). The feature amount is a yellow density included in a value of the density measurement for the blank part. The yellow density is used to determine the OBA amount contained in the sheet. On the basis of a result of the determination, the procedure proceeds to any of S1104, S1105, and S1106. In the present exemplary embodiment, the OBA contained in the sheet whose yellow (yellow component) density obtained by the measurement of the blank part with use of the ILS 123 is less than 0.01 is determined to be "no". On the other hand, the OBA contained in the sheet whose yellow density in a status-A is 0.01 or more and less than 0.05 is determined to be "small". The OBA contained in the sheet whose yellow density in the status-A is 0.05 or more is determined to be "large". Such thresholds are examples and it is needless to say that a combination of other numeric values is also able to achieve the flow of the present exemplary embodiment. The optical brightening agent amount determination unit 512 determines the OBA content of the sheet to be determined in S1104, S1105, and S1106, and the OBA amount is displayed in the operation unit 151 as indicated in a UI 1203 of FIG. 12 (S1107).

The optical brightening agent amount determination unit 512 receives an instruction through the UI screen and asks the user to select whether to "register (S1108)" a result of the display of the optical brightening agent amount, whether to switch to manual input (S1110), or whether to cancel the change itself (S1112). In the case of the cancel, the flow ends without registering the OBA amount in S1113.

When the register is selected in a UI 1205, a content displayed in a "current OBA setting value (UI 1203)" is stored in the optical brightening agent amount storage 510 (S1109). At this time, an OBA setting value stored as default for the sheet by the supplier or an OBA setting value that is automatically input or manually input by the user before the present flow is overwritten.

On the other hand, in the image processing apparatus 101 in which the manual input is selected in S1110, the optical brightening agent amount is manually input (S1111) and the procedure returns to S1107.

When determining that neither the automatic input or the manual input is instructed in S1108, the CPU 141 does not change the OBA amount similarly to the case where the cancel button is pressed and ends an operation of the automatic input of the optical brightening agent amount in a certain time.

Next, technical description for determining the yellow density by using the ILS 123 will be given.

In a case where the yellow is used for image formation, when an amount of a coloring material thereof (for example, an amount of yellow toner) is changed, a reflectance of a short wavelength region when light is radiated to the coloring material changes in accordance with the amount of the coloring material. That is, when the yellow density is measured, an index by which the change of the short wavelength region is able to be detected is used.

On the other hand, the OBA acts in accordance with a principle of fluorescence, and thus absorbs light of the short wavelength region of mainly 400 nm to 450 nm and emits light stronger than incident light. Accordingly, when the OBA content of the sheet is large, an amount of light that is emitted increases, and therefore, light of the short wavelength region is strongly emitted compared to a case where the OBA content of the sheet is small. Since the light of the short wavelength region has a blue color, the blue light is strongly emitted, resulting that the detected yellow density is low. Thus, when the OBA content of the sheet is large, the detected yellow density of the blank part is lower than that of the case where the OBA content of the sheet is small. In the present exemplary embodiment, a threshold is provided for the yellow density to determine the OBA content.

Note that, in the present exemplary embodiment, the status A is used for all densities. The status is a kind of a filter when a densitometer of a filter type is used. Another status such as a status T may be used to achieve the flow of the present exemplary embodiment, and the threshold of the yellow density to determine the OBA content may be changed in accordance with a property of the filter.

Furthermore, density measurement may be performed by a densitometer of a spectral type and a form of the density measurement is not limited. Note that, in the aforementioned flow, the case where the OBA amount is registered in sheet information in advance or the method of determining the OBA amount of the sheet to register the OBA amount in sheet information has been described. However, a form in which the OBA amount is determined when performing color management and the color management is performed on the basis of the OBA amount may be provided. At this time, the form may be such that the OBA amount is used only once. That is, the OBA amount may be determined by measuring the yellow density of the blank part in accordance with an intention of the user each time color management is performed, or a form in which the OBA amount is registered in sheet information may be provided. In this manner, it is needless to say that there is no limitation on whether or not to save the determined OBA amount and on an operation form in which the OBA amount is measured.

With the foregoing procedure, the OBA amount contained in the sheet is able to be automatically determined without causing the user to perform determination and color management with high precision is able to be achieved.

Exemplary Embodiment 2

In the exemplary embodiment 1, description has been given on the basis of a configuration of the image processing system in which the first chromaticity value measured in the image forming apparatus 100 is converted into the second chromaticity value in the image processing apparatus 101, but there is no limitation thereto. For example, a configuration in which the second chromaticity conversion processing performed in the image processing apparatus 101 is performed in the image forming apparatus 100 may be provided.

In such a case, without using the image processing apparatus 101, the color management unit processing (such as the color check processing, the calibration processing, or the color profile creation processing each of which is described above) may be executed in the image forming apparatus 100. In such a case, the image forming apparatus 100 may also have a configuration similar to that of the color management unit 505 described above.

Moreover, in a case where the color management in the image forming apparatus 100 is performed by using the image processing apparatus 101, the image processing apparatus 101 may receive, from the image forming apparatus 100, the second chromaticity value acquired in the image forming apparatus 100 and use the second chromaticity value in color management processing to be performed by the image processing apparatus 101.

By automatically determining the OBA content of a sheet, an appropriate colorimetric value is able to be acquired even when the sheet to be used is a sheet that contains the OBA.

The units described throughout the present disclosure are exemplary and/or preferable modules for implementing processes described in the present disclosure. The term "unit", as used herein, may generally refer to firmware, software, hardware, or other component, such as circuitry or the like, or any combination thereof, that is used to effectuate a purpose. The modules can be hardware units (such as circuitry, firmware, a field programmable gate array, a digital signal processor, an application specific integrated circuit, or the like) and/or software modules (such as a computer readable program or the like). The modules for implementing the various steps are not described exhaustively above. However, where there is a step of performing a certain process, there may be a corresponding functional module or unit (implemented by hardware and/or software) for implementing the same process. Technical solutions by all combinations of steps described and units corresponding to these steps are included in the present disclosure.

Other Embodiments

Embodiment(s) of the present disclosure can also be realized by a computerized configuration(s) of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computerized configuration(s) of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computerized configuration(s) may comprise one or more processors, one or more memories, circuitry, or a combination thereof (e.g., central processing unit (CPU), micro processing unit (MPU), or the like), and may include a network of separate computers or separate processors to read out and execute the computer executable instructions. The computer executable instructions may be provided to the computerized configuration(s), for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2018-114903, filed Jun. 15, 2018, which is hereby incorporated by reference herein in its entirety.

What is claimed is:

1. An image processing apparatus comprising:
an acquisition unit configured to acquire a lightness and chromaticity value, which is a measurement result for a sheet to be measured, by using a sensor in which a light source has fixed characteristics;
a designation unit configured to designate an illuminant condition for converting the measurement result;
a determination unit configured to determine an optical brightening agent amount contained in the sheet by using a density of a yellow component in chromaticity value acquired by the sensor for a blank part in the sheet, in which an image is not formed; and
a lightness and chromaticity value conversion unit configured to convert the lightness and chromaticity value, which is acquired by the acquisition unit, by using the illuminant condition designated by the designation unit and the optical brightening agent amount determined by the determination unit.

2. The image processing apparatus according to claim 1, wherein the sensor is a spectral color measurement device in which a wavelength of the light source has a fixed length.

3. The image processing apparatus according to claim 1, wherein the illuminant condition is a condition about characteristics of illumination used for the sensor to perform color measurement of the sheet.

4. The image processing apparatus according to claim 1, wherein when the illuminant condition designated by the designation unit varies, a conversion table of the acquired lightness and chromaticity value, which is used by the lightness and chromaticity value conversion unit, varies.

5. The image processing apparatus according to claim 1, further comprising
a management unit configured to be connected to an image forming apparatus including an image forming unit, and to manage a color of an image, which is formed by the image forming unit, by using the lightness and chromaticity value converted by the lightness and chromaticity value conversion unit.

6. The image processing apparatus according to claim 1, further comprising
a registration unit configured to register information of the sheet, wherein
the registration unit for the sheet registers the information about the optical brightening agent amount contained in the sheet.

7. An image processing method comprising:
acquiring a lightness and chromaticity value, which is a measurement result for a sheet to be measured, by using a sensor in which a light source has fixed characteristics;
designating an illuminant condition for converting the measurement result;
determining an optical brightening agent amount contained in the sheet by using a density of a yellow component in chromaticity value acquired by the sensor for a blank part in the sheet, in which an image is not formed; and
converting the lightness and chromaticity value, which is acquired in the acquiring, by using the illuminant condition designated in the designating and the optical brightening agent amount determined in the determining.

8. The image processing method according to claim 7, further comprising
registering information of the sheet, wherein
the registering for the sheet registers the information about the optical brightening agent amount contained in the sheet.

9. The image processing method according to claim 7, further comprising
managing a color of an image, which is formed by image forming, by using the lightness and chromaticity value converted by the converting.

10. The image processing method according to claim 7, wherein the sensor is a spectral color measurement device in which a wavelength of the light source has a fixed length.

11. The image processing method according to claim 7, wherein the illuminant condition is a condition about characteristics of illumination used for the sensor to perform color measurement of the sheet.

12. The image processing method according to claim 7, wherein when the illuminant condition designated by the designating varies, a conversion table of the acquired lightness and chromaticity value, which is used by the converting, varies.

13. A non-transitory storage medium storing instructions that, when executed by a computer, cause the computer to perform an image processing method comprising:
acquiring a lightness and chromaticity value, which is a measurement result for a sheet to be measured, by using a sensor in which a light source has fixed characteristics;

designating an illuminant condition for converting the measurement result;

determining an optical brightening agent amount contained in the sheet by using a density of a yellow component in chromaticity value acquired by the sensor for a blank part in the sheet, in which an image is not formed; and converting the lightness and chromaticity value, which is acquired in the acquiring, by using the illuminant condition designated in the designating and the optical brightening agent amount determined in the determining.

\* \* \* \* \*